United States Patent
Nannen et al.

(10) Patent No.: US 11,637,514 B2
(45) Date of Patent: Apr. 25, 2023

(54) METHOD FOR CONTROLLING THE SPEED OF A THREE-PHASE PERMANENT MAGNET MACHINE HAVING A SOFT STARTER BY MEANS OF A CONTROLLER CASCADE, AND THREE-PHASE MACHINE

(71) Applicant: Siemens Aktiengesellschaft, Munich (DE)

(72) Inventors: Hauke Nannen, Nuremberg (DE); Heiko Zatocil, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 170 days.

(21) Appl. No.: 17/277,410

(22) PCT Filed: Sep. 26, 2018

(86) PCT No.: PCT/EP2018/076124
§ 371 (c)(1),
(2) Date: Mar. 18, 2021

(87) PCT Pub. No.: WO2020/064098
PCT Pub. Date: Apr. 2, 2020

(65) Prior Publication Data
US 2022/0038036 A1   Feb. 3, 2022

(51) Int. Cl.
*H02P 6/15*   (2016.01)
(52) U.S. Cl.
CPC .......... *H02P 6/157* (2016.02); *H02P 2207/05* (2013.01)

(58) Field of Classification Search
CPC .. H02P 6/157; H02P 2207/05; H02P 21/0021; H02P 21/0025; H02P 6/182; H02P 1/04; H02P 3/18; H02P 27/16
(Continued)

(56) References Cited

U.S. PATENT DOCUMENTS 5,825,152 A * 10/1998 Eriksson ............... H02P 25/024
318/803
2015/0333663 A1   11/2015 Rockwell

FOREIGN PATENT DOCUMENTS

DE   102013221939 A1   4/2015
WO   WO 2014063722 A1   5/2014
(Continued)

OTHER PUBLICATIONS

PCT International Search Report and Written Opinion of International Searching Authority dated Jun. 18, 2019 corresponding to PCT International Application No. PCT/EP2018/076124 filed Sep. 26, 2018.
(Continued)

*Primary Examiner* — David Luo
(74) *Attorney, Agent, or Firm* — Harness, Dickey & Pierce, P.L.C.

(57) ABSTRACT

A battery state estimating apparatus as an embodiment includes a state estimator, a power estimator, and a determiner. The state estimator estimates a state of a battery. The power estimator estimates first power amount charged/discharged by the battery within a charging/discharging period, based on the state. The determiner compares the first power amount with second power amount inputted/outputted to/from the battery within the charging/discharging period and thereby determines validity of the state.

20 Claims, 6 Drawing Sheets

(58) Field of Classification Search
USPC .............................. 318/400.13, 400.01, 700
See application file for complete search history.

(56) References Cited

FOREIGN PATENT DOCUMENTS

| WO | WO 2018072810 A1 | 4/2018 |
| WO | WO 2018086688 A1 | 5/2018 |

OTHER PUBLICATIONS

Zatocil Heiko et al.: "Sensor less start-up of soft starter driven IE4 motors", 2017 19th European Conference on Power Electronics and Applications (EPE117 ECCE Europe), Jointly Owned IEEE-PELS and EPE Association, XP033250354, DOI: 10.23919/EPE17ECCEEUROPE.2017.8098972, [gefunden am Nov. 6, 2017]; 2017.

Benecke Marcel: "Anlauf von energieeffizienten Synchronmaschinen mit Drehstromsteller", XP055392434, gefunden im Internet: URL:http://d-nb.info/1054135258/34, [gefunden am Jul. 20, 2017], the whole document; 2012.

\* cited by examiner

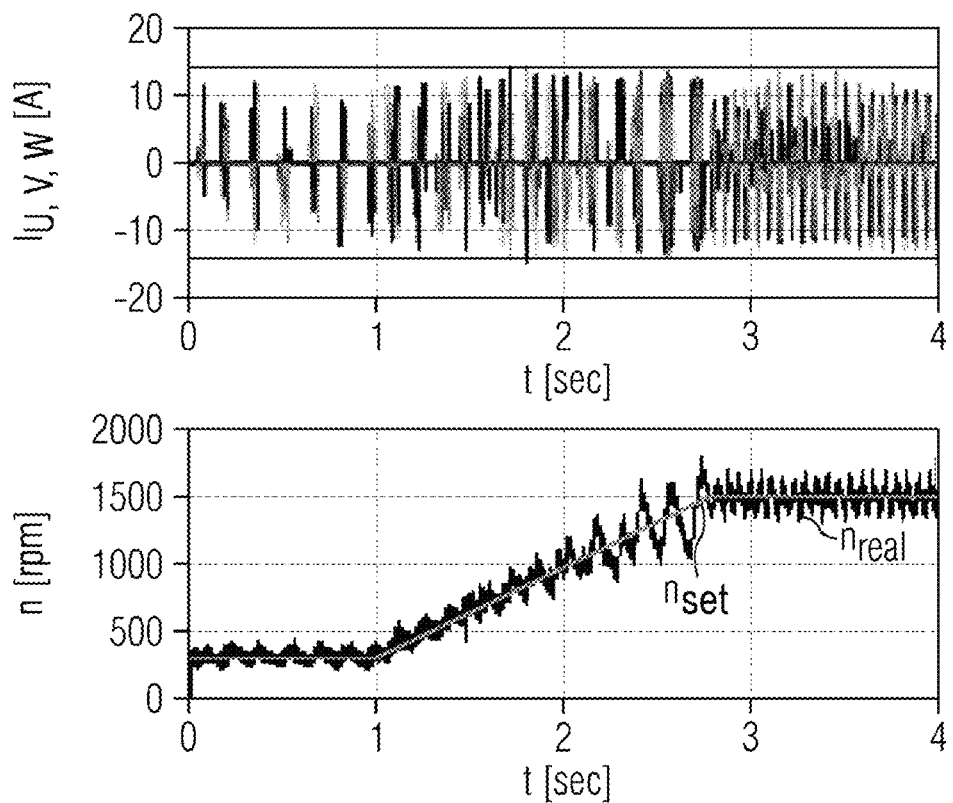
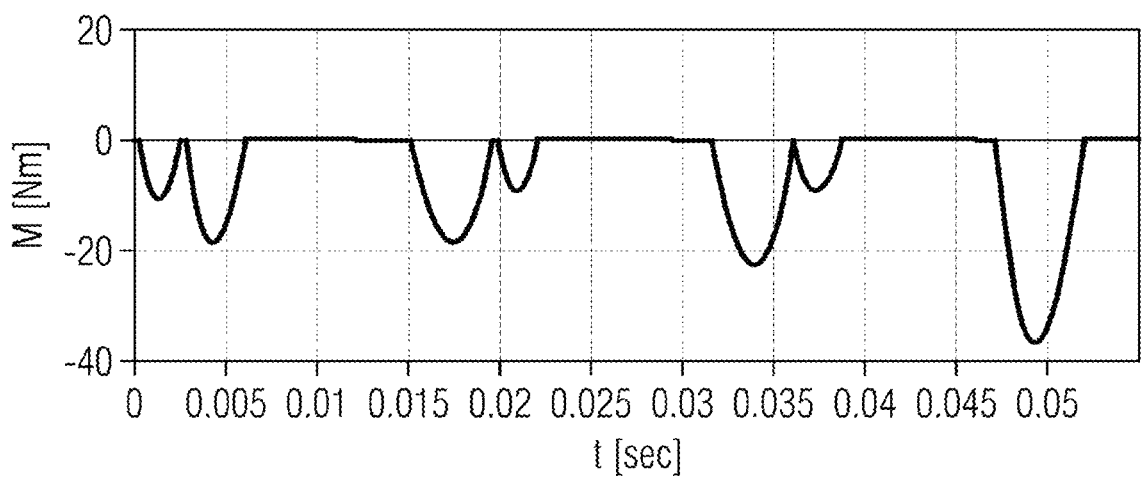

METHOD FOR CONTROLLING THE SPEED OF A THREE-PHASE PERMANENT MAGNET MACHINE HAVING A SOFT STARTER BY MEANS OF A CONTROLLER CASCADE, AND THREE-PHASE MACHINE

PRIORITY STATEMENT

This application is the national phase under 35 U.S.C. § 371 of PCT International Application No. PCT/EP2018/076124 which has an International filing date of Sep. 28, 2018, which designated the United States of America, the entire contents of which are hereby incorporated herein by reference.

FIELD

Embodiments of the present invention generally relate to a three-phase machine and method of controlling the machine.

BACKGROUND

A three-phase machine converts mechanical energy into three-phase current or three-phase current into mechanical energy. In principle, it can be operated as an electrical generator or as an electric motor. Measures for power limitation during the switching-on of an electrical device, for example an electric motor, are referred to as soft starting.

In accordance with IEC standard 60034, three-phase machines are rated in terms of their efficiency in different energy efficiency classes. Even in the lower power range up to approximately 20 kW, it is only with difficulty that the legally prescribed efficiencies for electric drives can be met, for which reason the use of permanent magnets in the rotor is increasingly desired, for example as a permanent magnet synchronous machine (PMSM).

FIG. 1 shows a schematic representation of such a permanent magnet synchronous machine M, in an embodiment as a revolving-field machine comprising a stator St and a rotor L. The rotor comprises a magnetic north pole N and south pole S. The stator St comprises winding phases U, V, W. The representation should be understood as shown merely by way of example and does not have any restrictive effect on the scope of protection of the claimed subject matter.

This type of machine does provide the possibility of high degrees of energy efficiency, but starting and operation on the stiff power supply system are not readily possible.

In order to make this possible, a damper cage can be provided in the rotor of the machine, allowing safe runup on the stiff power supply system but subjecting the feeding power supply system to severe loads owing to very high starting currents.

Similarly, operation on a suitable power electronics actuator, such as for example a frequency converter or soft starter, is possible. In this case, in particular the use of a soft starter represents a low-cost solution to the runup of a permanent magnet synchronous machine on the stiff power supply system. Such a soft starter reduces the voltage during switching-on (for example by means of leading-edge phase control), and slowly increases it up to the full system voltage. Such a soft start is however often only possible in the no-load state or when there is a small load. However, at present there is so far no market-ready solution known for this.

In the dissertation by Dr. Marcel Benecke (University of Magdeburg) entitled "Anlauf von energieeffizienten Synchronmaschinen mit Drehstromsteller" [Starting of energy-efficient synchronous machines using a three-phase power controller], a solution to the runup of the permanent magnet synchronous machine on a soft starter is presented. The method presented in this work however requires the present angular displacement of the machine, with the result that the motors used for the work had to be equipped with a corresponding sensor system. A sensor is understood to mean a speed sensor and position sensor. These sensors detect the mechanical variables of speed and position. Their signals are necessary for supplying actual values to the closed-loop controllers and for closing the existing position and speed control loops. The position and speed signals also act as an important input variable for the current control loop for the vectorial closed-loop control methods in three-phase drives. The sensor in this case detects the speed and/or position directly on the motor shaft.

SUMMARY

The inventors have discovered that the sensor system does however have a negative effect on the costs and availability of the system, which at present makes a soft starter solution unattractive for high-efficiency motors. For these reasons, a method for running up without a sensor is desired.

The inventors have discovered that when a permanent magnet synchronous machine is operating with a soft starter, a speed control that has not so far been feasible in practice would be desirable for implementing a wide variety of applications.

The inventors have discovered that the required method differs from the sensorless methods known in the prior art to the extent that it must be able to be used for a thyristor controller and not a frequency converter. Consequently, these known methods cannot be applied.

At least one embodiment of the invention specifies a method for operating a permanent magnet synchronous machine without a sensor that allows an external load to be kept in place. At least one embodiment of the invention specifies a permanent magnet synchronous machine without a sensor that operates by the method according to at least one embodiment of the invention.

Embodiments are achieved by a method and by a control device and a three-phase machine. Advantageous refinements are provided by the claims.

At least one embodiment of the present application describes a method for controlling the speed of a three-phase permanent magnet machine having a soft starter comprising thyristors by means of a controller cascade. In an embodiment of the method, all possible firing times of the thyristors of the soft starter are calculated and a torque assigned to each firing time, which results from the firing of the thyristors at a respective firing time, is determined. A torque corridor is determined based upon a prescribed calculation specification, to which an actual speed ($n_{act}$) and a setpoint torque ($M_{set}$) are fed as input variables. It is determined by a comparison which of the torques determined lies in the torque corridor. Then, the firing time of the thyristors assigned to the determined torque is ascertained. Subsequently, the thyristors are fired at the assigned firing time.

Also proposed is a control device for a three-phase machine having a soft starter which is distinguished by the fact that it is designed to carry out the method of an embodiment described herein. This has the same associated advantages as have been described in conjunction with the method according to an embodiment of the invention.

In particular, the control device for controlling the speed of a three-phase permanent magnet machine having a soft starter comprising thyristors by way of a controller cascade comprises a speed controller, a firing-time calculation unit and an adaptation unit. The firing-time calculation unit is designed to calculate all possible firing times of the thyristors of the soft starter and also to determine a torque assigned to each firing time, which results from the firing of the thyristors at a respective firing time. The adaptation unit is designed to determine a torque corridor based upon a prescribed calculation specification, which is fed an actual speed and a setpoint torque, and is fed to the speed controller for processing. The firing-time calculation unit is designed to determine which of the determined torques lies in the torque corridor and to ascertain the assigned firing time of the thyristors. Furthermore, the firing-time calculation unit is designed to fire the thyristors at the firing time assigned to them.

Furthermore, a three-phase machine having a soft starter is proposed. This machine is designed for carrying out the method of an embodiment described herein, thereby allowing the three-phase machine to be kept in position.

BRIEF DESCRIPTION OF THE DRAWINGS

The invention is explained in more detail with regard to embodiments below based upon the figures:

FIGS. 7 to 9 show time profiles of the speed and the phase currents of three different measurements of a step change in speed for implementing an intermediate speed;

FIG. 10 shows a time profile of the torque for producing a reversal of the direction of rotation of the three-phase machine;

DETAILED DESCRIPTION OF THE EXAMPLE EMBODIMENTS

Figure 1:
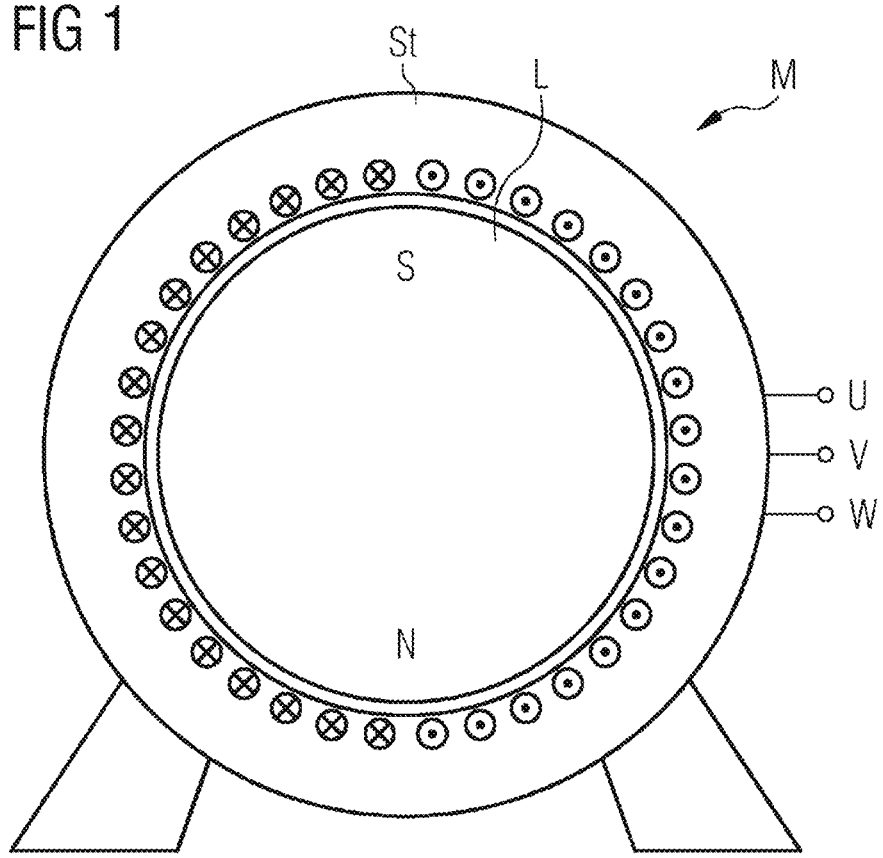
FIG. 1 shows a section through a three-phase machine given by way of example.

At least one embodiment of the present application describes a method for controlling the speed of a three-phase permanent magnet machine having a soft starter comprising thyristors by means of a controller cascade. In an embodiment of the method, all possible firing times of the thyristors of the soft starter are calculated and a torque assigned to each firing time, which results from the firing of the thyristors at a respective firing time, is determined. A torque corridor is determined based upon a prescribed calculation specification, to which an actual speed ($n_{act}$) and a setpoint torque ($M_{set}$) are fed as input variables. It is determined by a comparison which of the torques determined lies in the torque corridor. Then, the firing time of the thyristors assigned to the determined torque is ascertained. Subsequently, the thyristors are fired at the assigned firing time.

In the case of a classic speed controller cascade, consisting of a speed controller and a current/torque controller, the setpoint torque, which the speed controller outputs, is converted by the current controller one-to-one. In this way it is possible that the setpoint speed can be maintained very well and that the speed setpoint value and actual value coincide well even when there are setpoint step changes.

When a permanent magnet synchronous machine is operating with a soft starter, this is not possible. Use is made here of a method presented by the applicant in WO 2018/086688 A1 (the entire contents of which are hereby incorporated herein by reference), in which the motor is accelerated to the maximum with the first firing of the thyristors of the soft starter and subsequently the angle of flow of the machine is calculated based upon the induced voltages measured. After the first firing operation, the angle of flow of the machine can already be ascertained directly from the measured terminal voltage (the phase currents are in the meantime zero).

The ascertainment of the firing times is based initially on the direct measurement of the induced voltages, that is to say the electromotive force, EMF. For the following firing operation, it is then possible to use the calculated angle. As a result, the angle can be ascertained from the measured voltages very well even at low speeds.

In order actually to accelerate the machine to the maximum with the first firing, the optimum firing angle for starting the machine may be exactly ascertained (the starting angle is known) in the course of a commissioning process, which is described in WO 2018/072810 A1, the entire contents of which are hereby incorporated herein by reference.

The method known from the applicant and used in the course of this process cannot apply a constant torque, but only a time-variable (in first approximation sinusoidal) torque. Similarly, this torque cannot be freely selected and exactly set at a specific level (via the current) as in the case of the pulse-width-modulated machine with current control, since the method presented by the applicant does not represent torque control. If a reasonably good firing opportunity is missed, it may sometimes take several milliseconds before there is again a suitable situation for firing the thyristors. If, therefore, in view of these circumstances, a classic controller cascade were used for speed control, the system would not be able to function.

The method proposed according to at least one embodiment of the invention eliminates these disadvantages, in that the calculation of the firing times is modified with the aid of the determined torque corridor. The torque corridor allows the determination of the firing times in dependence on various operating points, for example in dependence on the actual speed. The actual speed may in this case be measured with the aid of a sensor or be calculated from the EMF.

In order to ensure that in first approximation the required setpoint torque is applied, and not a torque that is much too large or much too small, the speed- and setpoint-torque-dependent corridor in which the average value of the predicted, time-variable torque comes to lie is defined. Since the method does not constitute a current controller, it is in this way ensured that the setpoint torque and the actual torque assume similar values.

Compared with an asynchronous motor on the soft starter, this allows new applications. In particular in the case of applications in which there is predominantly continuous running, but nevertheless temporarily lower speeds are required, a favorable alternative to the motor operated with a frequency converter may be provided by way of a soft starter and three-phase permanent magnet machine with a damper cage. An example of this that may be given is simple positioning with two light barriers.

An expedient refinement provides that no firing of the thyristors takes place if no assigned torque comes to lie in the torque corridor for all possible firing times. As a result, the rotor of the three-phase machine cannot be accelerated "wrongly", i.e. with a torque that is too large or too small.

It is also expedient if, in a case in which a number of the determined torques come to lie in the torque corridor, the torque-assigned firing time that is selected is the one for which the assigned torque comes closest to the setpoint torque. This allows control of the speed that comes closest to the desired objective.

An expedient refinement provides that the calculation specification comprises an upper limit and a lower limit. The upper limit is defined by a percentage allowance added to the setpoint torque. The lower limit is defined by a percentage allowance subtracted from the setpoint torque. As a result, the corridor has a varying width, dependent on the level of the ascertained or required setpoint torque, this width becoming greater with increasing level of the setpoint torque. This means that, as the setpoint torque increases, increasing deviations are possible for the predicted torque and, as a result, there is an increased probability of finding suitable firing times for firing the thyristors of the soft starter.

As an alternative or in addition, it may be provided that the calculation specification comprises an upper limit and a lower limit, the upper limit being defined by an absolute allowance added to the setpoint torque $M_{set}$. The lower limit is defined by an absolute allowance subtracted from the setpoint torque $M_{set}$. As a result, the corridor has the same width, irrespective of the level of the ascertained or required setpoint torque, or, in conjunction with the percentage allowance added, a uniform widening. This increases the probability of being able to calculate suitable firing times for firing the thyristors of the soft starter.

A further refinement provides that the setpoint torque is adapted to the load characteristic, an adapted setpoint torque being ascertained from the setpoint torque and the actual speed. As a result, the maximum setpoint torque that is used as an input variable for ascertaining the firing times can be limited. It can therefore be expediently provided that a maximum permissible setpoint torque is ascertained from the actual speed, in particular based upon one or more torque-speed characteristic curves.

Furthermore, the maximum permissible setpoint torque may be processed as an input variable for determining the torque corridor, the maximum permissible setpoint torque being processed as the setpoint torque. As an alternative or in addition, it may be envisaged to determine the adapted setpoint torque from the maximum permissible setpoint torque and the setpoint torque. In this case, it is provided in particular that the new setpoint torque is chosen to be smaller than the maximum permissible setpoint torque. As a result, it is ensured that the speed controller does not require a torque that is too large and would accelerate the drive too quickly. In a traditional controller cascade, this effect (overshooting of the speed) would be compensated for example by a negative setpoint torque for a short time. This is not readily possible here for the reasons mentioned above. Therefore, no undesired speed fluctuations may occur.

The refinements described above allow a ramp-shaped starting of the motor with freely selectable acceleration and also a specific reduction of the speed by means of a deceleration ramp. Furthermore, operation of the motor for a short time at a freely selectable speed is possible, which can be used for example for rudimentary positioning applications (starting with two speeds).

A further expedient refinement provides that the firing times are ascertained in such a way that a negative torque is generated for a reversal of the direction of rotation of the three-phase machine. If the determination of the firing times is changed to the effect that, if required, only negative torques are permitted, a stationary three-phase machine can be accelerated in a negative direction of rotation—that is to say that the direction of rotation is reversed. Since the feeding power supply system then has an oppositely directed direction of rotation, the machine can be accelerated in the negative direction to about 60% of its rated speed. An advantage of this solution is that no additional contactor is required for reversing the direction of rotation. A revolving field with negative rotation, which consequently has the effect of reversing the direction of rotation of the three-phase machine, is generated just by way of suitable choice of the firing time of the thyristors. It should be noted that the described method is not intended for continuous operation of the machine, but only for accelerating the machine to a speed band.

A further expedient refinement provides that a positive torque and a negative torque are alternately generated for cyclically changing the direction of rotation of the three-phase machine. According to this refinement, in particular after an alignment of the three-phase machine as described with respect to the commissioning process disclosed in WO 2018/072810 A1, the three-phase machine is preferably accelerated with a maximum torque in the positive direction of rotation until the actual speed exceeds a threshold value. Subsequently, the three-phase machine is accelerated with preferably the maximum negative torque in the negative direction of rotation until the actual speed exceeds a second speed threshold value and acceleration again takes place in the positive direction of rotation. The three-phase machine therefore cyclically changes the sign of the mechanical speed. Depending on the parameterization of the threshold values, a large or small speed control range can be set. The possible abrupt change in speed and direction of rotation can be used for example for dislodging deposits on a pump.

Also proposed is a control device for a three-phase machine having a soft starter which is distinguished by the fact that it is designed to carry out the method of an embodiment described herein. This has the same associated advantages as have been described in conjunction with the method according to an embodiment of the invention.

In particular, the control device for controlling the speed of a three-phase permanent magnet machine having a soft starter comprising thyristors by way of a controller cascade comprises a speed controller, a firing-time calculation unit and an adaptation unit. The firing-time calculation unit is designed to calculate all possible firing times of the thyristors of the soft starter and also to determine a torque assigned to each firing time, which results from the firing of the thyristors at a respective firing time. The adaptation unit is designed to determine a torque corridor based upon a prescribed calculation specification, which is fed an actual speed and a setpoint torque, and is fed to the speed controller for processing. The firing-time calculation unit is designed to determine which of the determined torques lies in the torque corridor and to ascertain the assigned firing time of the thyristors. Furthermore, the firing-time calculation unit is designed to fire the thyristors at the firing time assigned to them.

The firing-time calculation unit is also designed not to carry out firing of the thyristors if no assigned torque comes to lie in the torque corridor for all possible firing times. In a further refinement, the firing-time calculation unit is designed such that, in a case in which a number of the determined torques lie in the torque corridor, the torque-assigned firing time that it selects is the one for which the assigned torque comes closest to the setpoint torque.

Furthermore, a three-phase machine having a soft starter is proposed. This machine is designed for carrying out the method of an embodiment described herein, thereby allowing the three-phase machine to be kept in position.

Figure 2:
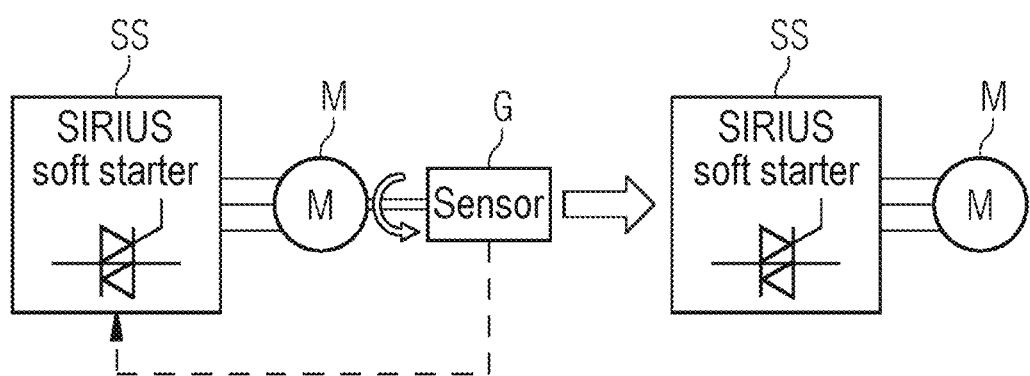
FIG. 2 shows a schematic representation of the construction according to an embodiment of the invention.

FIG. 2 shows the basic desired construction of the three-phase machine, designed as a permanent magnet synchronous machine M, having a soft starter SS (for example a Sirius soft starter) without a sensor and with a sensor G on the left. As described at the beginning, the three-phase machine may be designed for example as a revolving-field machine comprising a stator St and a rotor L. The rotor L comprises a magnetic north pole N and south pole S. The stator St comprises winding phases U, V, W. The rotor L may be connected, for example for conjoint rotation (or by way of a gear mechanism), to a shaft (not shown), which is acted upon by an external load with a torque, in particular a constant torque.

With the aid of the method described below, which is based on the method presented by the applicant in WO 2018/086688 A1 and is referred to below as the sensorless starting method, the calculation of firing times of the thyristors of the soft starter SS is brought about.

The sensorless starting method is based on the concept that, when the thyristors are fired for the first time, the three-phase machine (also: the motor) is accelerated with the maximum possible torque. In this way it is intended to ensure that, after the first-time firing, the motor has already exceeded a certain minimum speed, and consequently the induced voltages during the inherent off-state interval of the thyristors can be measured sufficiently accurately. The electrical angle of the motor can subsequently be ascertained from the induced voltages based upon the already known so-called EMF method and can be transferred to the Benecke method (from the aforementioned dissertation). Moreover, during a two-phase firing, the voltage of the third phase can be measured directly and taken into account in the evaluation.

Since motors on soft starters usually drive passive loads with linear or quadratic load characteristic curves, the torque serves during the first-time firing almost completely for the acceleration of the inert mass. To this extent it can be assumed that the acceleration during the first-time firing is sufficient and the induced voltages can be measured sufficiently accurately. The measuring sensor systems that are present in any case in the soft starter can be used for measuring the voltages. The method therefore does not require any additional hardware.

The sensorless starting method comprises two steps.

Step 1: Ascertaining the optimum firing angle:

Once the method for the initial alignment of the machine has been completed, the present angle of the motor is known. Based upon this known starting angle, that firing angle of the soft starter with which the torque generated in the motor is at a maximum for a given maximum current can be calculated according to the aforementioned method. In order to develop a torque that is as high as possible during the first-time firing of the thyristors, the maximum permissible current in the first-time firing is set to the maximum current permissible for the power semiconductors.

The calculation of the optimum firing angle is generally based also on the profile of the angle of rotation and the rotational speed during the firing of the thyristors, but these are not known when the firing angle is calculated. For this reason, the optimum firing angle for the first-time firing is to be ascertained in advance for the drive in the course of a commissioning process.

Step 2: Switching over to the EMF (electromotive force) method:

Once the permanent magnet synchronous machine has been accelerated by the first-time firing, the voltages induced by the rotation of the machine are great enough to be able to be measured during the off-state phase of the thyristors. Subsequently, the angle of flow of the machine can be ascertained from the measured voltages, for example by an observer or by a simple arctangent calculation. Similarly, it is conceivable to ascertain the angle of rotation solely based upon the exciting voltages, the measured currents and the machine equations, that is to say with the aid of a calculation specification.

Irrespective of the chosen approach, numerous methods from the area of sensorless control are already known in the cases mentioned, and can be used here. The angle of flow ascertained by the EMF method is transferred to the Benecke method as an actual value and used to ascertain the next optimum firing angle during rotation of the machine.

Figure 3:
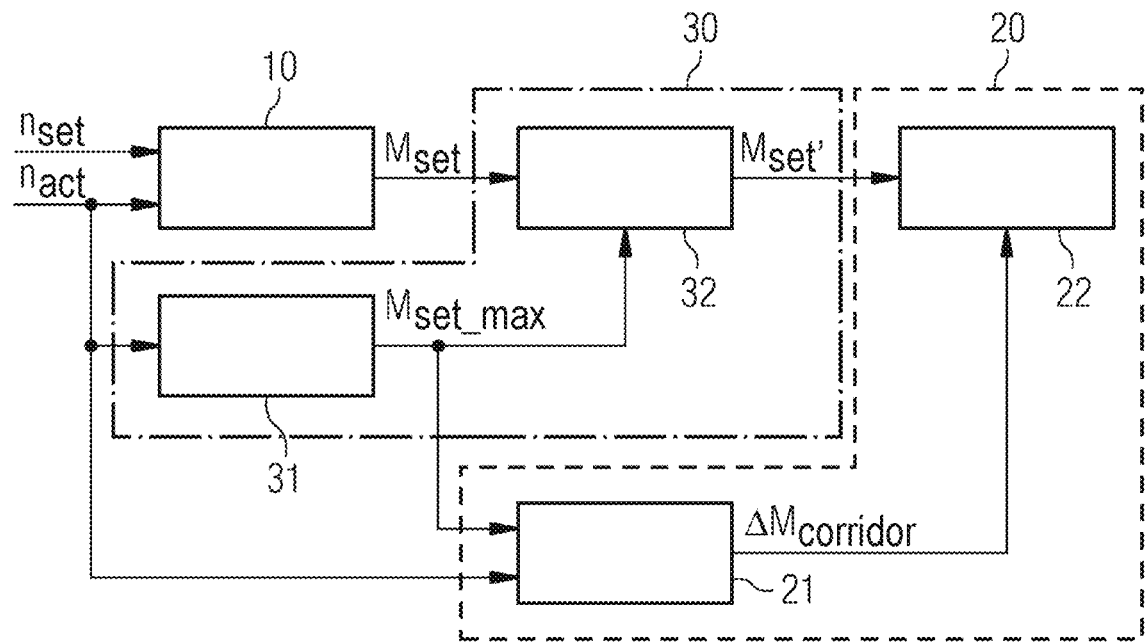
FIG. 3 shows a controller cascade according to an embodiment of the invention.

FIG. 3 shows a controller cascade used in the course of the method according to the invention for controlling the speed of the three-phase permanent magnet machine. This cascade comprises a speed controller 10, a firing-time calculation unit 20 and a load-characteristic determination unit 30.

The speed controller 10 is designed to ascertain a setpoint torque $M_{set}$ for the three-phase machine M from a setpoint speed $n_{set}$ and an actual speed $n_{act}$. The actual speed $n_{act}$ can be measured by means of a sensor. The actual speed $n_{act}$ may also be calculated from the EMF.

The firing-time calculation unit 20 comprises a determination unit 22, which, as described above, is designed to carry out the calculation of the firing times, in order to achieve as well as possible the setpoint torque $M_{set}$ fed to it. The determination unit 22 is consequently designed to carry out the sensorless starting method and to output all possible firing times for the firing of the thyristors of the soft starter SS.

The firing-time calculation unit 20 additionally comprises an adaptation unit 21, which is designed to determine a torque corridor $\Delta M_{corridor}$ based upon a prescribed calculation specification, which is fed the actual speed $n_{act}$ and the setpoint torque $M_{set}$. The torque corridor is fed to the determination unit 22 of the firing-time calculation unit 20 for determining the firing times of the thyristors of the soft starter.

The determination unit 22 calculates all possible firing times of the thyristors of the soft starter (SS) and determines a torque assigned to each firing time, resulting from the firing of the thyristors at a respective firing time. Subsequently, the determination unit 22 determines which of the determined torques lies in the torque corridor and ascertains the assigned firing time of the thyristors. Then the determination unit 22 issues a corresponding signal for firing the thyristors at the assigned firing time.

If no assigned torque comes to lie in the torque corridor $\Delta M_{corridor}$ for all possible firing times, no signal for firing the thyristors is output. If, on the other hand, a number of the determined torques lie in the torque corridor $\Delta M_{corridor}$, the torque-assigned firing time that is selected is the one for which the assigned torque comes closest to the setpoint torque $M_{set}$.

The calculation specification processed by the adaptation unit 21 may be based on one or more previously defined characteristic curves, which define or delimit the torque corridor. The calculation specification processed by the adaptation unit 21, or the corridor thereby defined, comprises an upper limit and a lower limit. The upper limit is defined by a percentage allowance added to the setpoint torque $M_{set}$. The lower limit is defined by a percentage allowance subtracted from the setpoint torque $M_{set}$. As a result, the corridor has a varying width, dependent on the level of the ascertained or required setpoint torque $M_{set}$, this width becoming greater with increasing level of the setpoint torque.

As an alternative or in addition, it may be provided that the calculation specification comprises an upper limit and a lower limit, the upper limit being defined by an absolute allowance added to the setpoint torque $M_{set}$. The lower limit is defined by an absolute allowance subtracted from the setpoint torque $M_{set}$. As a result, the corridor has the same width, irrespective of the level of the ascertained or required setpoint torque, or, in conjunction with the percentage allowance added, a uniform widening. This increases the probability of being able to calculate suitable firing times for firing the thyristors of the soft starter.

The merely optional load-characteristic determination unit 30 serves for adapting the setpoint torque $M_{set}$ to the load characteristic from the setpoint torque $M_{set}$ and the actual speed $n_{act}$. The load-characteristic determination unit 30 comprises a unit 31, which is designed to ascertain a maximum permissible setpoint torque $M_{set\_max}$ from the actual speed $n_{act}$, in particular based upon one or more torque-speed characteristic curves. In other words, the assigned maximum permissible setpoint torque $M_{set\_max}$ is ascertained for an actual speed $n_{act}$ occurring at the particular time from a characteristic curve established in advance, for example by trials or numerical simulations. The load-characteristic determination unit 30 also comprises a limitation unit 32.

The maximum permissible setpoint torque $M_{set\_max}$ is fed on the one hand to the adaptation unit 21 for determining the torque corridor $\Delta M_{corridor}$, by which the maximum permissible setpoint torque $M_{set\_max}$ is processed as the setpoint torque $M_{set}$. On the other hand, the maximum permissible setpoint torque $M_{set\_max}$ is fed to the limitation unit 32, which determines from the maximum permissible setpoint torque $M_{set\_max}$ and the setpoint torque an adapted setpoint torque $M_{set'}$, which is fed as a reference variable to the determination unit 22. In the simplest case, the maximum permissible setpoint torque $M_{set\_max}$ is used as the adapted setpoint torque $M_{set'}$, although other additional transformations are possible. In particular, the adapted setpoint torque $M_{set'}$ is chosen to be smaller than the maximum permissible setpoint torque $M_{set\_max}$.

The controller cascade shown in FIG. 3, consisting of the speed-adaptive speed controller 10 and a modified algorithm (21, 22 and optionally 31, 32) allows calculation of the firing times. In dependence on the actual speed $n_{act}$, the maximum setpoint torque $M_{set\_max}$ is limited by the load-characteristic determination unit 30. If the torque-speed characteristic curve of the load is taken into account in characteristic curve 1, it is ensured by the unit 31 that the speed controller 10 does not require a torque that is too large and would accelerate the motor too quickly. In order to ensure that in first approximation the required torque (i.e. the adapted setpoint torque $M_{set'}$) is applied, and not a torque that is much too large or much too small, a speed- and setpoint-torque-dependent corridor in which the average value of the predicted, time-variable torque is to lie is defined. Since the algorithm does not constitute a current controller, it is in this way ensured that the setpoint torque and the actual torque assume similar values.

Figure 4:
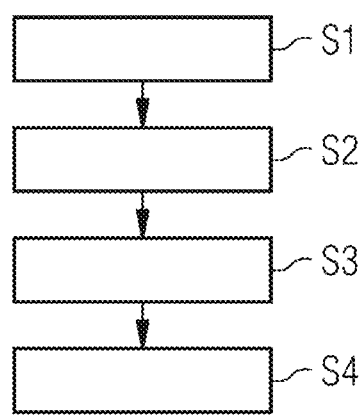
FIG. 4 shows a flow diagram of the method according to an embodiment of the invention.

FIG. 4 shows a flow diagram of the method according to the invention. In step S1, all possible firing times of the thyristors of the soft starter are ascertained and a torque assigned to each firing time, which results from the firing of the thyristors at a respective firing time, is determined. In step S2, a torque corridor is determined based upon a prescribed calculation specification, to which the actual speed and the setpoint torque are fed as input variables. The torque corridor is processed for calculating the firing time. In step S3, the determination of which of the determined torques lies in the torque corridor and the ascertainment of the assigned firing time of the thyristors take place. Finally, in step S4, the firing of the thyristors at the assigned firing time takes place.

The described method is based solely on the measured values that are already present in a standard unit and does not require any additional sensor equipment. It is consequently possible just to provide an existing product with additional software for the operation of an 1E4 motor.

There now also follows a description of applications based on speed control.

Slowing-Down Ramp Function

Figure 5:
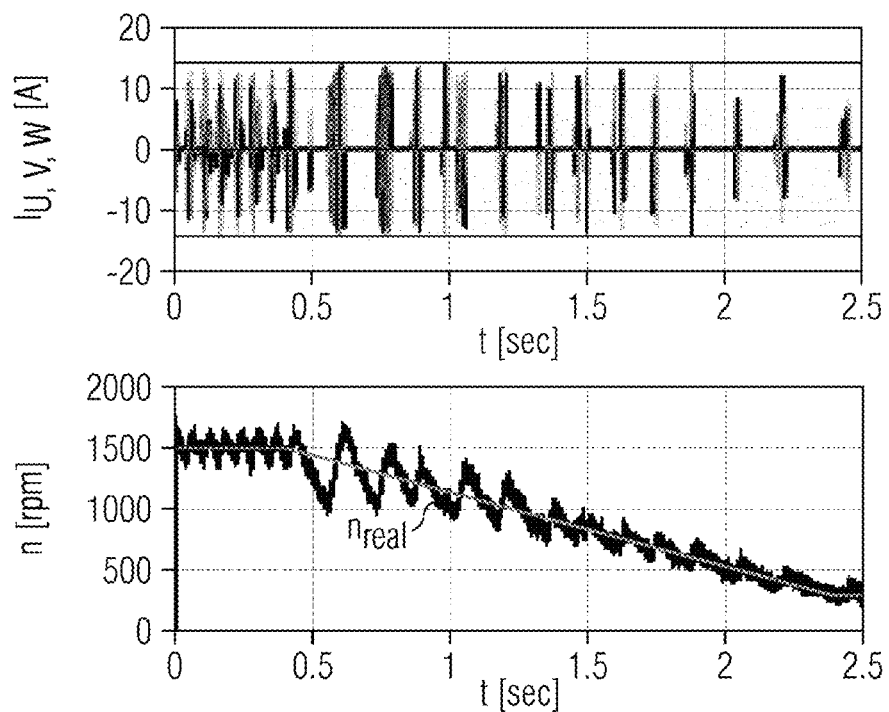
FIGS. 5 and 6 show time profiles of the speed and the phase currents of two different measurements of a slowing-down ramp function.
Figure 6:
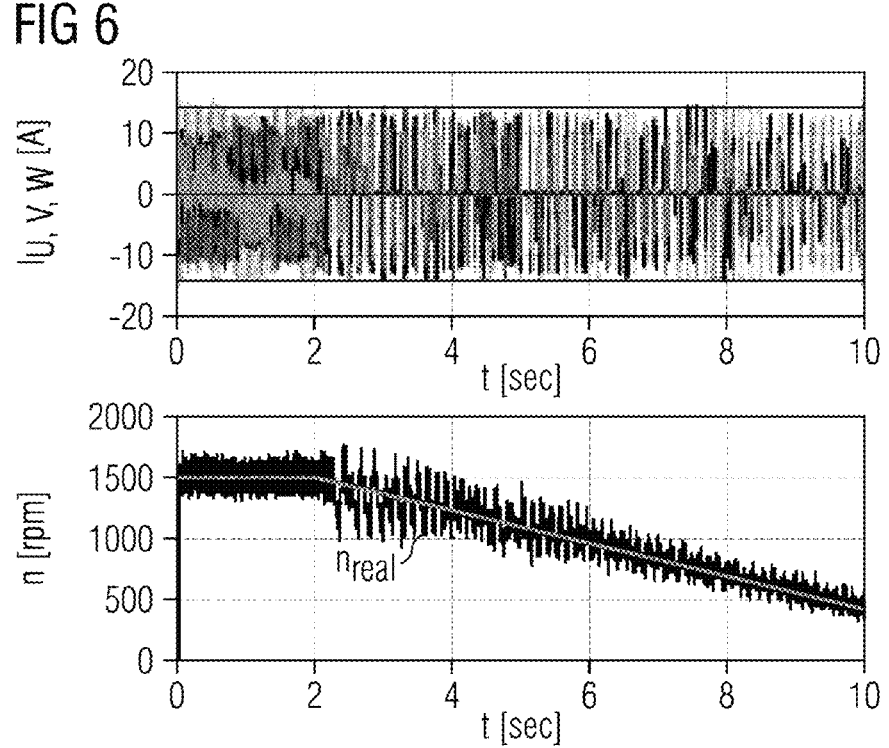

The time profiles of the speed n and the phase currents IU, V, W of the three phases U, V, W that are represented in FIGS. 5 and 6 result from two different measurements of the slowing down of a permanent magnet motor on a soft starter. Throughout the measurement, the motor is loaded with a quadratic torque, which at rated speed corresponds to the rated torque. The actual speed is indicated in each case in the lower diagram of FIGS. 5 and 6 by $n_{real}$. In order to prevent abrupt stopping of the motor, a torque that controls a slow reduction of the speed is also generated in the machine.

Similar to FIG. 5, FIG. 6 shows a running down of the machine. FIG. 6 additionally shows that much slower running down is also possible. The slowing down of high-efficiency permanent magnet motors on the soft starter allows them to be used in pump applications. For example, the slowing down prevents damage being caused by water hammer (also known as pressure surge).

Intermediate Speeds

The controller cascade may also be used for the temporary operation of a high-efficiency permanent magnet motor at speeds lower than the rated speed. For example, fixed speeds may be preconfigured.

Figure 7:
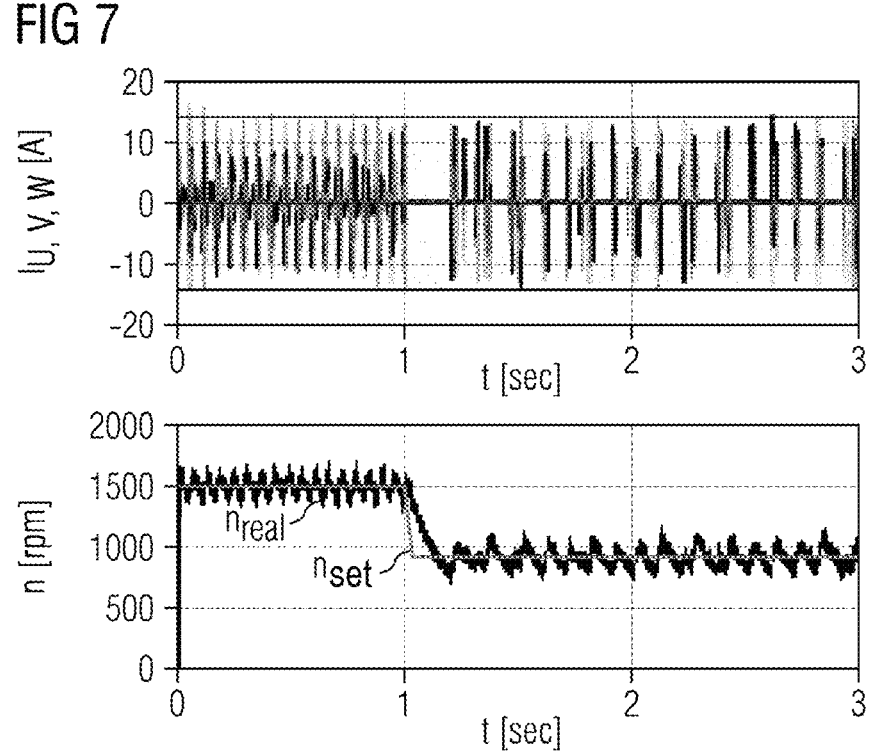
Figure 8:
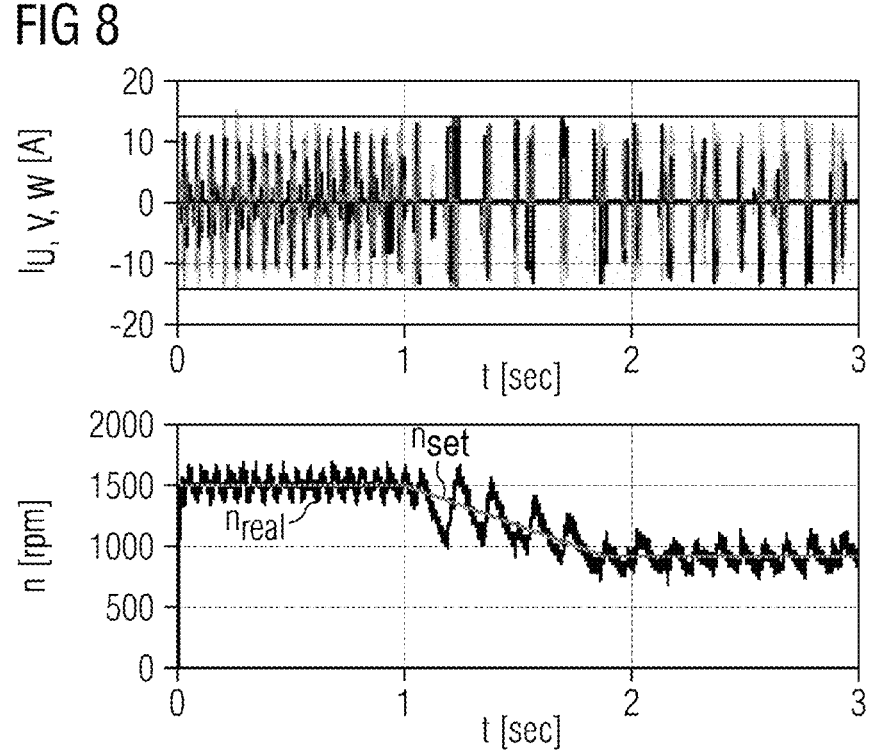

FIGS. 7 to 9 show time profiles of the speed n and the phase currents $I_{U,V,W}$ of the three phases U, V, W from three different measurements of a step change in speed for the implementation of an intermediate speed. The actual speed is indicated in each case in the lower diagram of FIGS. 7 to 9 by $n_{real}$.

FIG. 7 shows a step change in speed from the rated speed (n=1500 rpm) to a lower speed (n=900 rpm) with a full load torque. A setpoint speed $n_{set}$ is prescribed almost in the form of a step change. There is a slight delay in accordance with the inertia of the motor. It can be seen that both speed levels are maintained and, apart from the speed ripple caused by the only very limited controllability of the thyristor, coincide.

The measurement shown in FIG. 8 has been recorded under the same conditions as those in FIG. 7, with the only difference being that this time a speed ramp is prescribed as the setpoint value $n_{set}$ instead of a step change in speed. As already in the case of the fixed speeds, the motor can also follow this ramp well.

The measurement shown in FIG. 9 shows the opposite case of the acceleration of the motor from the speed n=350 rpm to the speed n=1500 rpm. As also in the case of the change from the rated speed to a lower speed stage presented in FIG. 8, the following of a speed ramp is readily possible.

The measurements in FIGS. 5 to 9 show that operation with a loaded machine is possible at different speeds below the rated speed of the high-efficiency permanent magnet motor on the soft starter. The transitions can also be freely configured. Compared with an asynchronous motor on the soft starter, this allows completely new applications. In particular in the case of applications in which there is predominantly continuous running, but nevertheless temporarily lower speeds are required, a favorable alternative to the motor operated with a frequency converter can be provided by means of a soft starter and permanent magnet motor with a damper cage.

An example of this that may be given is simple positioning with two light barriers. If the unit to be positioned passes through the first light barrier, the motor speed is reduced from supply-system speed to a much lower speed (for example 20% of the supply-system speed) and the unit to be positioned is decelerated. Then the device continues until the second light barrier is also passed through, and complete braking of the device is performed. As a result of the prior reduction in the speed, it is brought to a timely standstill and further overshooting of the intended position (which would occur in particular in the case of great and variable inertias) is prevented. Such an application can only be implemented at present by means of a frequency converter.

Reversal of the Direction of Rotation

Figure 11:
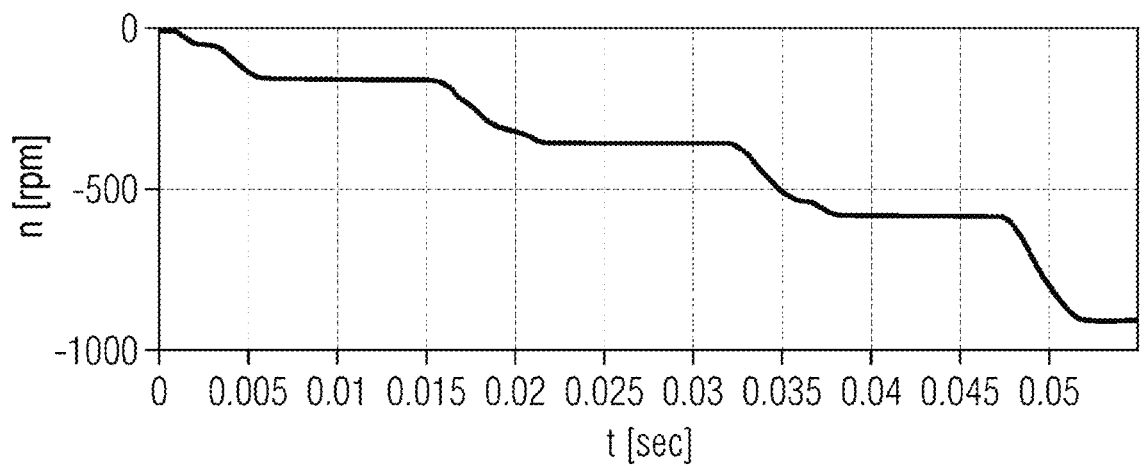
FIG. 11 shows the time profile of the speed when there is a reversal of the direction of rotation.
Figure 12:
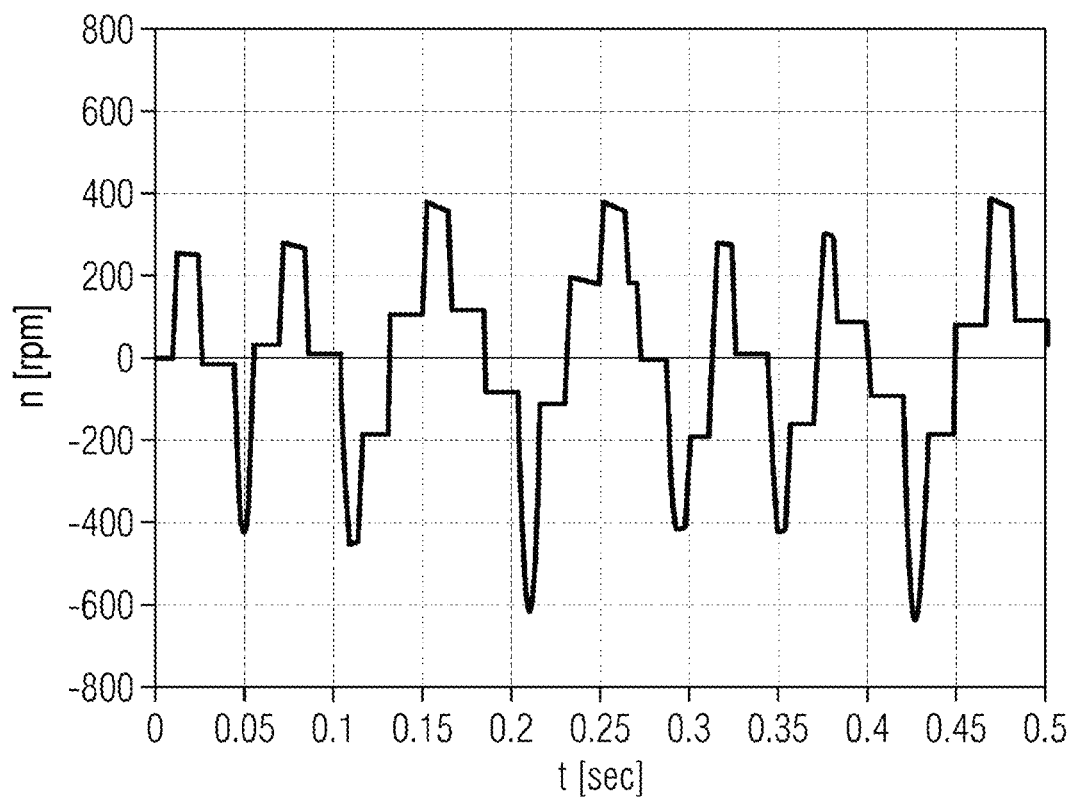
FIG. 12 shows the time profile of the speed with an activated reversing function.

The controller cascade allows the firing times also to be ascertained in such a way that a negative torque is generated. This allows a reversal of the direction of rotation of the three-phase machine, as FIGS. 10 and 11 show. If the determination of the firing times is changed to the effect that, if required, only negative torques are permitted, a stationary three-phase machine can be accelerated in a negative direction of rotation—that is to say that the direction of rotation is reversed. Since the feeding power supply system then has an oppositely directed direction of rotation, the machine can be accelerated in the negative direction to about 60% of its rated speed.

An advantage of this solution is that no additional contactor is required for reversing the direction of rotation. A revolving field with negative rotation, which consequently has the effect of reversing the direction of rotation of the three-phase machine, is generated just by means of suitable choice of the firing time of the thyristors.

It should be noted that the reversal of the direction of rotation is not intended for continuous operation of the machine, but only for accelerating the machine to a certain speed band.

Alternating Changing of the Direction of Rotation

A further expedient refinement provides that a positive torque and a negative torque are alternately generated for cyclically changing the direction of rotation of the three-phase machine. Here, in particular after an alignment of the three-phase machine as described with respect to the commissioning process (WO 2018/072810 A1), the three-phase machine is preferably accelerated with a maximum torque in the positive direction of rotation until the actual speed exceeds a threshold value. Subsequently, the three-phase machine is accelerated with preferably the maximum negative torque in the negative direction of rotation until the actual speed exceeds a second speed threshold value and acceleration again takes place in the positive direction of rotation. The three-phase machine therefore cyclically changes the sign of the mechanical speed.

Depending on the parameterization of the threshold values, a large or small speed control range can be set. The possible abrupt change in speed and direction of rotation can be used for example for dislodging deposits on a pump. Thus, for example, the reversing function may be activated for a few seconds at fixed time intervals (daily, weekly, monthly, etc.), in order to prevent deposits. Time-consuming and costly replacement of the pump can be prevented, or at least delayed, by the described function.

The invention claimed is:

1. A method for controlling a speed of a three-phase permanent magnet machine including a soft starter including thyristors by way of a controller cascade, the method comprising:
calculating all possible firing times of the thyristors of the soft starter and determining a corresponding torque assigned to each respective firing time of the firing times calculated, resulting from firing of the thyristors at a respective firing time;
determining a torque corridor based upon a calculation specification, to which an actual speed and a setpoint torque are fed as input variables;
determining which of the determined corresponding torques lies in the torque corridor and ascertaining, for each corresponding torques determined to lie in the torque corridor, determining the correspondingly assigned firing time of the thyristors; and
firing the thyristors at the correspondingly assigned firing time.

2. The method of claim 1, wherein no firing of the thyristors takes place upon none of the corresponding torques being determined to lie in the torque corridor for all possible respective firing times.

3. The method of claim 2, wherein, upon a number of the corresponding torques being determined to lie in the torque corridor, the torque-assigned firing time that is selected is a firing time for which the respectively assigned torque comes relatively closest to the setpoint torque.

4. The method of claim 2, wherein the calculation specification includes an upper limit and a lower limit, the upper limit being defined by a percentage allowance added to the setpoint torque and the lower limit being defined by a percentage allowance subtracted from the setpoint torque.

5. The method of claim 2, wherein the calculation specification includes an upper limit and a lower limit, the upper limit being defined by an absolute allowance added to the setpoint torque and the lower limit being defined by an absolute allowance subtracted from the setpoint torque.

6. The method of claim 2, wherein the setpoint torque is adapted to a load characteristic, an adapted setpoint torque being ascertained from the setpoint torque and the actual speed.

7. The method of claim 1, wherein, upon a number of the corresponding torques being determined to lie in the torque corridor, the torque-assigned firing time that is selected is a firing time for which the respectively assigned torque comes relatively closest to the setpoint torque.

8. The method of claim 7, wherein, upon a number of the corresponding torques being determined to lie in the torque corridor, the torque-assigned firing time that is selected is a firing time for which the respectively assigned torque comes relatively closest to the setpoint torque.

9. The method of claim 7, wherein the calculation specification includes an upper limit and a lower limit, the upper limit being defined by a percentage allowance added to the setpoint torque and the lower limit being defined by a percentage allowance subtracted from the setpoint torque.

10. The method of claim 1, wherein the calculation specification includes an upper limit and a lower limit, the upper limit being defined by a percentage allowance added to the setpoint torque and the lower limit being defined by a percentage allowance subtracted from the setpoint torque.

11. The method of claim 1, wherein the calculation specification includes an upper limit and a lower limit, the upper limit being defined by an absolute allowance added to the setpoint torque and the lower limit being defined by an absolute allowance subtracted from the setpoint torque.

12. The method of claim 1, wherein the setpoint torque is adapted to a load characteristic, an adapted setpoint torque being ascertained from the setpoint torque and the actual speed.

13. The method as claimed in claim 12, wherein a maximum permissible setpoint torque is ascertained from the actual speed.

14. The method as claimed in claim 13, wherein the maximum permissible setpoint torque is processed as an input variable for determining the torque corridor, the maximum permissible setpoint torque being processed as the setpoint torque.

15. The method of claim 12, wherein the adapted setpoint torque is determined from the maximum permissible setpoint torque and the setpoint torque.

16. The method of claim 15, wherein the adapted setpoint torque is chosen to be relatively smaller than the maximum permissible setpoint torque.

17. The method of claim 1, wherein the firing times are ascertained in such a way that a negative torque is generated for a reversal of a direction of rotation of the three-phase permanent magnet machine.

18. The method of claim 1, wherein the firing times are ascertained in such a way that a positive torque and a negative torque are alternately generated for cyclically changing a direction of rotation of the three-phase permanent magnet machine.

19. A control device for a three-phase machine including a soft starter including thyristors, comprising:
 at least one processor, configured to carry out at least:
  calculating all possible firing times of the thyristors of the starter and determining a corresponding torque assigned to each respective firing time of the firing times calculated, resulting from firing of the thyristors at a respective firing time;
  determining a torque corridor based upon a calculation specification, to which an actual speed and setpoint torque are fed as input variables;
  determining which of the determined corresponding torques lies in the torque corridor and ascertaining, for each corresponding torques determined to lie in the torque corridor, determining the correspondingly assigned firing time of the thyristors; and
  firing the thyristors at the correspondingly assigned firing time.

20. A three-phase machine including asoft starter, comprising:
 the control device of claim 19, to control the three-phase machine.

* * * * *